United States Patent
Choi et al.

(10) Patent No.: US 9,543,829 B2
(45) Date of Patent: Jan. 10, 2017

(54) SWITCHING REGULATOR AND COMPARATOR-BASED ZERO CURRENT DETECTION METHOD USED BY THE SWITCHING REGULATOR

(71) Applicant: SAMSUNG ELECTRONICS CO., LTD., Suwon-si (KR)

(72) Inventors: Min-ho Choi, Seoul (KR); Dong-Jin Keum, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 254 days.

(21) Appl. No.: 14/146,775

(22) Filed: Jan. 3, 2014

(65) Prior Publication Data

US 2014/0191744 A1 Jul. 10, 2014

(30) Foreign Application Priority Data

Jan. 7, 2013 (KR) .................. 10-2013-0001644

(51) Int. Cl.
| | |
|---|---|
| *H02M 1/32* | (2007.01) |
| *H02M 3/15* | (2006.01) |
| *H02M 3/156* | (2006.01) |
| *H02M 3/158* | (2006.01) |
| *H02M 3/157* | (2006.01) |
| *H02M 1/00* | (2006.01) |

(52) U.S. Cl.
CPC .............. *H02M 3/156* (2013.01); *H02M 1/32* (2013.01); *H02M 3/157* (2013.01); *H02M 3/158* (2013.01); H02M 2001/0009 (2013.01); H02M 2001/0032 (2013.01)

(58) Field of Classification Search
CPC ............ H02M 2001/0032; H02M 1/32; H02M 3/157–3/158; H02M 3/588
See application file for complete search history.

(56) References Cited

U.S. PATENT DOCUMENTS

| | | | | |
|---|---|---|---|---|
| 6,724,174 B1* | 4/2004 | Esteves | ................. | H02M 3/155 323/224 |
| 7,166,992 B2* | 1/2007 | Kudo | .................. | H02M 3/1588 323/282 |
| 7,279,877 B1 | 10/2007 | Tseng | | |
| 7,652,945 B2 | 1/2010 | Chu et al. | | |
| 7,940,596 B2 | 5/2011 | Chu et al. | | |
| 8,093,876 B2* | 1/2012 | Araki | ...................... | H02M 1/32 323/283 |

(Continued)

*Primary Examiner* — Timothy J Dole
*Assistant Examiner* — Ishrat Jamali
(74) *Attorney, Agent, or Firm* — Sughrue Mion, PLLC

(57) ABSTRACT

Provided are a switching regulator and a comparator-based zero current detection method. The switching regulator comprises: a switch configured to connect to a switching node and control an inductor current flowing through the switching node; and a switch controller configured to control a turn-off time of the switch by detecting a change in a voltage of the switching node after the switch is turned off, wherein the switch controller comprises: a comparator configured to compare a first voltage applied to a first input terminal connected to the switching node with a second voltage applied to a second input terminal connected to a first terminal of the switch; and a control logic configured to receive a comparison signal of the comparator and control an offset of the comparator to adjust the turn-off time of the switch.

20 Claims, 8 Drawing Sheets

(56) References Cited

U.S. PATENT DOCUMENTS

| | | | |
|---|---|---|---|
| 8,111,051 B2 | 2/2012 | Sakai et al. | |
| 8,421,425 B1* | 4/2013 | Wu | G01R 19/25 |
| | | | 323/223 |
| 2006/0044853 A1* | 3/2006 | Oswald | H02M 3/1588 |
| | | | 363/72 |
| 2006/0119340 A1* | 6/2006 | Tateishi | H02M 3/1588 |
| | | | 323/284 |
| 2006/0164057 A1* | 7/2006 | Kudo | H02M 3/1588 |
| | | | 323/282 |
| 2006/0208717 A1* | 9/2006 | Shimizu | H02M 3/157 |
| | | | 323/284 |
| 2006/0220629 A1* | 10/2006 | Saito | H02M 3/157 |
| | | | 323/282 |
| 2008/0211473 A1* | 9/2008 | Tlasksl | H02M 1/38 |
| | | | 323/283 |
| 2008/0298106 A1 | 12/2008 | Tateishi | |
| 2009/0027020 A1* | 1/2009 | Qiu | H02M 3/1588 |
| | | | 323/282 |
| 2009/0295350 A1* | 12/2009 | Yamada | H02M 3/1588 |
| | | | 323/282 |
| 2011/0254526 A1 | 10/2011 | Luo et al. | |
| 2012/0025788 A1 | 2/2012 | Bekasi | |
| 2012/0235653 A1* | 9/2012 | Chen | H02M 3/1588 |
| | | | 323/271 |

\* cited by examiner

600

SWITCHING REGULATOR AND COMPARATOR-BASED ZERO CURRENT DETECTION METHOD USED BY THE SWITCHING REGULATOR

This application claims priority from Korean Patent Application No. 10-2013-0001644 filed on Jan. 7, 2013 in the Korean Intellectual Property Office, the disclosure of which is incorporated herein by reference in its entirety.

BACKGROUND

1. Field

Exemplary embodiments relate to a switching regulator and a comparator-based zero current detection method used by the switching regulator.

2. Description of the Related Art

In a related art, a synchronous type switching regulator requires a zero current detector to maximize its efficiency at a low load current. An inductor current detected by the zero current detector always varies according to environmental factors, such as the input voltage, output voltage, process distribution, etc., of the switching regulator. The variation in the inductor current leads to a change in the operation efficiency of the switching regulator.

SUMMARY

Aspects of the exemplary embodiments may provide a switching regulator with improved operation efficiency.

Aspects of the exemplary embodiments may also provide a comparator-based zero current detection method used by a switching regulator, the method being employed to improve the operation efficiency of the switching regulator.

However, aspects of the exemplary embodiments are not restricted to the one set forth herein. The above and other aspects of the exemplary embodiments will become more apparent to one of ordinary skill in the art to which the exemplary embodiments pertain by referencing the detailed description given below.

According to an aspect of the exemplary embodiments, there is provided a switching regulator including: a switch configured to connect to a switching node and controls an inductor current flowing through the switching node; and a switch controller configured to control a turn-off time of the switch by detecting a change in a voltage of the switching node after the switch is turned off, wherein the switch controller comprises: a comparator configured to compare a first voltage applied to a first input terminal connected to the switching node with a second voltage applied to a second input terminal connected to a first terminal of the switch; and a control logic configured to receive a comparison signal of the comparator and control an offset of the comparator to adjust the turn-off time of the switch.

According to another aspect of the exemplary embodiments, there is provided a comparator-based zero current detection method used by a switching regulator, the method including: setting an offset of a comparator, which has a value from 1 to n, to m; and setting the offset of the comparator to (m+1) if it is required to increase the offset set to m and if the offset of the comparator was set to m by being increased from (m−1), and maintaining the offset of the comparator at m for P times and then setting the offset of the comparator to (m+1) if it is required to increase the offset set to m and if the offset of the comparator was set to m by being decreased from (m+1), wherein 1≤m≤n, m and n are natural numbers, and P is a natural number.

According to yet another aspect of the exemplary embodiments, there is provided a switch controller including: a comparator including a first input terminal and a second input terminal, and configured to compare a first voltage applied to the first input terminal connected to an external switching node with a second voltage applied to the second input terminal connected to a first terminal of an external switch; and a control logic configured to receive a comparison signal of the comparator based on the comparison of the first voltage and the second voltage, and control an offset of the comparator to adjust a turn-off time of the external switch.

BRIEF DESCRIPTION OF THE DRAWINGS

The above and other aspects and features of the exemplary embodiments will become more apparent by describing in detail exemplary embodiments thereof with reference to the attached drawings, in which.

DETAILED DESCRIPTION OF THE EXEMPLARY EMBODIMENTS

Figure 1:
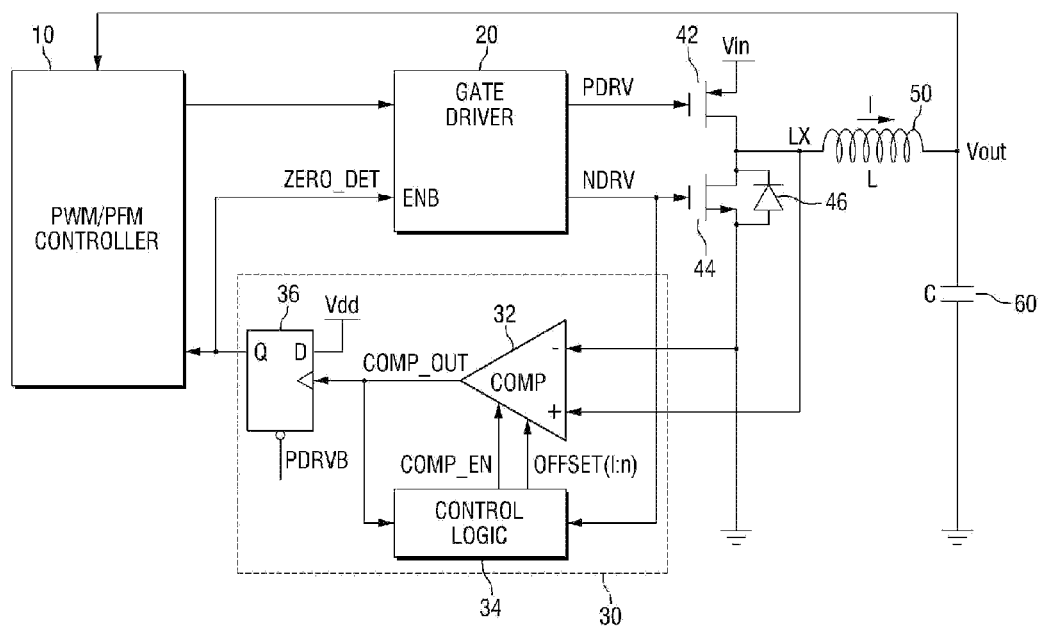
FIG. 1 is a circuit diagram of a switching regulator according to an embodiment.

Advantages and features of the exemplary embodiments and methods of accomplishing the same may be understood more readily by reference to the following detailed description of preferred embodiments and the accompanying drawings. The exemplary embodiments may, however, be embodied in many different forms and should not be construed as being limited to the embodiments set forth herein. Rather, these embodiments are provided so that this disclosure will be thorough and complete and will fully convey the concept of the exemplary embodiments to those skilled in the art. Further, the exemplary embodiments will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the exemplary embodiments The term "unit" or "module", as used herein, means, but is not limited to, a software or hardware component, such as a field programmable gate array (FPGA) or an application specific integrated circuit (ASIC), which performs certain tasks. A unit or module may advantageously be configured to reside in the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, a switching regulator according to an embodiment will be described with reference to FIG. 1.

FIG. 1 is a circuit diagram of a switching regulator according to an embodiment.

Referring to FIG. 1, the switching regulator includes a pulse controller 10, a gate driver 20, first and second switches 42 and 44, a switch controller 30, and an inductor 50.

The pulse controller 10 may generate a pulse control signal for controlling the gate driver 20 using a pulse width modulation (PWM) method or a pulse frequency modulation (PFM) method, and transmit the pulse control signal to the gate driver 20.

The gate driver 20 may be enabled by a zero current detection signal ZERO_DET output from the switch controller 30. When enabled, the gate driver 20 may provide a first switch control signal PDRV and a second switch control signal NDRV to the first switch 42 and the second switch 44, respectively, based on the pulse control signal received from the pulse controller 10.

In some embodiments, as shown in FIG. 1, the first switch 42 may be a PMOS transistor, and the second switch 44 may be an NMOS transistor. The first and second switches 42 and 44 may be connected to a switching node LX and control an inductor current I flowing through the switching node LX.

In particular, if the first switch 42 is a PMOS transistor, it may be turned on by the first switch control signal PDRV at a first level (e.g., a logical low level) output from the gate driver 20. The turned-on first switch 42 may pull up the switching node LX from an input voltage Vin applied to an input terminal, and the pulled-up switching node LX may increase the inductor current I flowing through the inductor 50. The first switch 42 may be turned off by the first switch control signal PDRV at a second level (e.g., a logical high level).

If the second switch 44 is an NMOS transistor, it may be turned on by the second switch control signal NDRV at the second level (e.g., the logical high level) output from the gate driver 20. The turned-on second switch 44 may pull down the voltage of the switching node LX, and the pulled-down switching node LX may reduce the inductor current I flowing through the inductor 50. The second switch 44 may be turned off by the second switch control signal NDRV at the first level (e.g., the logical low level).

The inductor current I controlled by the first and second switches 42 and 44 may charge electric charges into a charge storage device 60 which is implemented as, e.g., a capacitor. Accordingly, an output voltage Vout may be output from an output terminal. Here, the output voltage Vout may also be fed back to the pulse controller 10 as shown in the drawing.

The switching regulator configured as shown in FIG. 1 may be, for example, a step-down converter. However, the exemplary embodiments are not limited to the example of FIG. 1, and the embodiments can also be applied to, e.g., a step-up converter. When the embodiments are applied to a step-up converter, the first switch 42 and the second switch 44 may be configured in a different way from the configuration shown in FIG. 1. In other words, in other embodiments, the first switch 42 may be an NMOS transistor, and the second switch 44 may be a PMOS transistor.

The switching regulator configured as shown in FIG. 1 may be, but is not limited to, a synchronous type switching regulator.

The switch controller 30 controls a turn-off time of the second switch 44 by detecting a change in the voltage of the switching node LX after the second switch 44 is turned off. In particular, if the switch controller 30 turns off the second switch 44 at a time when the inductor current I is not completely zero, the voltage of the switching node LX may be changed (e.g., may be dropped) by a parasitic diode 46 existing between a first terminal and a second terminal of the second switch 44. Therefore, the switch controller 30 according to the current embodiment detects this change in the voltage of the switching node LX after the second switch 44 is turned off and controls the second switch 44 to be turned off at a time when the inductor current I is nearly zero. In other words, the switch controller 30 according to the current embodiment may serve as a zero current detector. The operation of the switching controller 30 will be described in detail later.

In some embodiments, the switch controller 30 may include a comparator 32, a control logic 34, and a D flip-flop 36 as shown in FIG. 1.

The comparator 32 may include a first input terminal + and a second input terminal −. As shown in FIG. 1, the first input terminal + may be connected to the switching node LX, and the second input terminal − may be connected to the first terminal of the second switch 44. The comparator 32 may compare a first voltage input to the first input terminal + with a second voltage input to the second input terminal −, and output a comparison signal COMP_OUT at the second level (e.g., the logical high level) if a predetermined condition is met (e.g., if the first voltage is greater than the second voltage).

The control logic 34 may receive the comparison signal COMP_OUT of the comparator 32 and control an offset of the comparator 32 by providing an offset control signal OFFSET(1:n) for controlling the turn-off time of the second switch 44 to the comparator 32. The offset of the comparator 32 according to the current embodiment may be controlled digitally. In other words, in the current embodiment, the offset of the comparator 32 may have any one value from 1 to n, where n is a natural number. Accordingly, the offset control signal OFFSET(1:n) provided from the control logic 34 to the comparator 32 may be, e.g., a digital signal.

In addition, the control logic 34 may receive the second switch control signal NDRV and provide an enable signal COMP_EN for enabling the comparator 32 to the comparator 32 at a predetermined time.

The control logic 34 operating, as described above, may be configured in various ways. An example of the configuration of the control logic 34 will now be described with reference to FIG. 2. However, the exemplary embodiments are not limited to this example.

Figure 2:
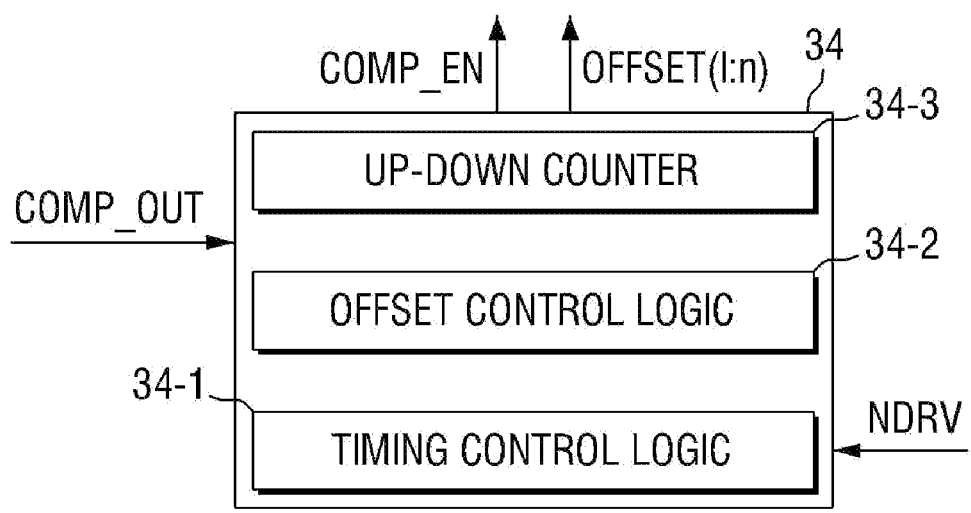
FIG. 2 is a detailed block diagram of a control logic shown in FIG. 1.

FIG. 2 is a detailed block diagram of the control logic 34 shown in FIG. 1.

Referring to FIG. 2, the control logic 34 may include a timing control logic 34-1, an offset control logic 34-2, and an up-down counter 34-3.

The timing control logic 34-1 may receive the second switch control signal NDRV from the gate driver 20 and control a time when the enable signal COMP_EN is transmitted to the comparator 32.

The offset control logic 34-2 may control the up-down counter 34-3 based on the comparison signal COMP_OUT received. The up-down counter 34-3 may be controlled by the offset control logic 34-2 to increase or reduce the number of bits of the digital offset control signal OFFSET(1:n).

Referring back to FIG. 1, when receiving the comparison signal COMP-OUT at the second level (e.g., the logical high level) from the comparator 32, the D flip-flop 36 may output a predetermined zero current detection signal ZERO_DET to the gate driver 20. The gate driver 20 which receives the zero current detection signal ZERO_DET may change a level of the second switch control signal NDRV from the second level (e.g., the logical high level) to the first level (e.g., the logical low level). As shown in FIG. 1, the zero current detection signal ZERO_DET output from the D flip-flop 36 may also be fed back to the pulse controller 10.

In the switching regulator described above, if the second switch 44 is turned off too early before the inductor current I becomes zero, the operation efficiency of the switching regulator may be reduced by a turn-on voltage of the parasitic diode 46. If the second switch 44 is turned off too late after the inductor current I becomes zero, a negative current may be generated within the switching regulator, and the inductor 50 may consume electric charges stored in the charge storage device 60. Therefore, the operation efficiency of the switching regulator may be reduced.

Therefore, if the second switch 44 is turned off too early before the inductor current I becomes zero, the switching regulator according to the current embodiment controls the zero current detection signal ZERO_DET to be output later, so that the second switch 44 can be turned off later. On the other hand, if the second switch 44 is turned off too late after the inductor current I becomes zero, the switching regulator according to the current embodiment controls the zero current detection signal ZERO_DET to be output earlier, so that the second switch 44 can be turned off earlier. The operation of the switching regulator according to the current embodiment will now be described in more detail with reference to FIGS. 1, 3 and 4.

Figure 3:
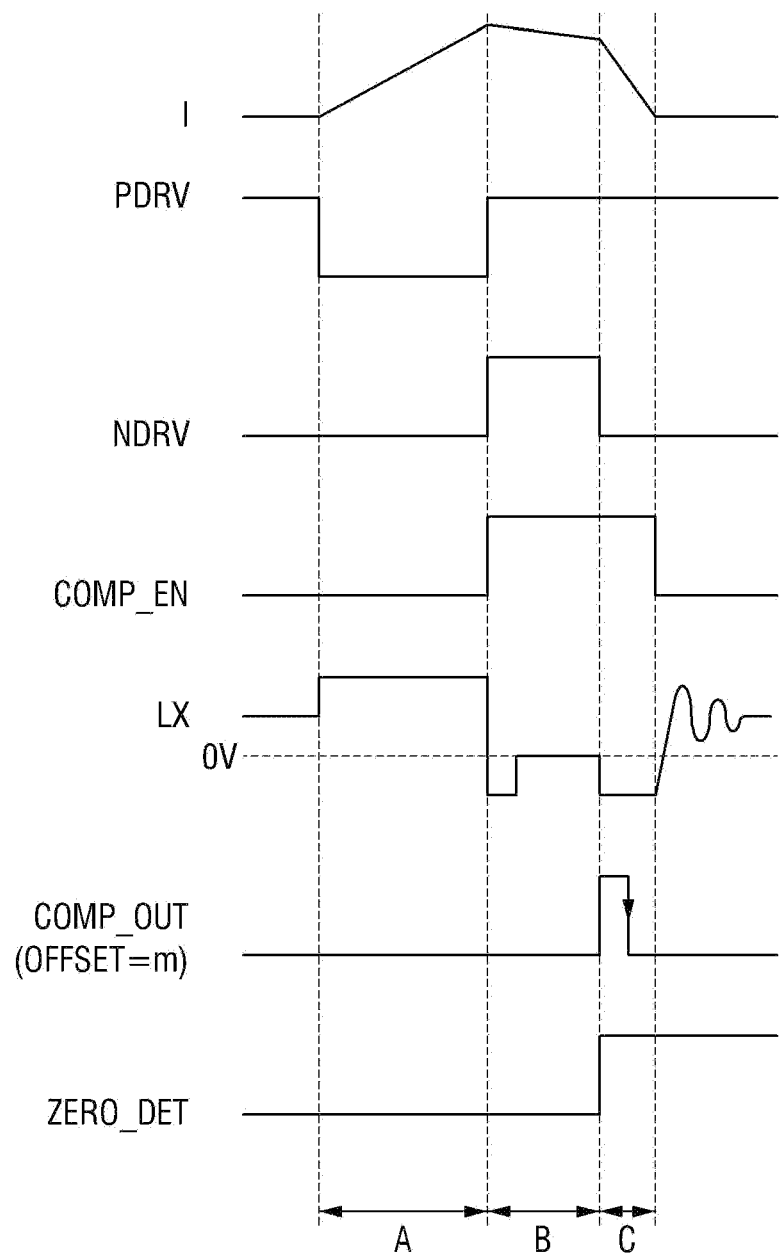
FIG. 3 is a timing diagram illustrating the operation of the switching regulator according to an embodiment.
Figure 4:
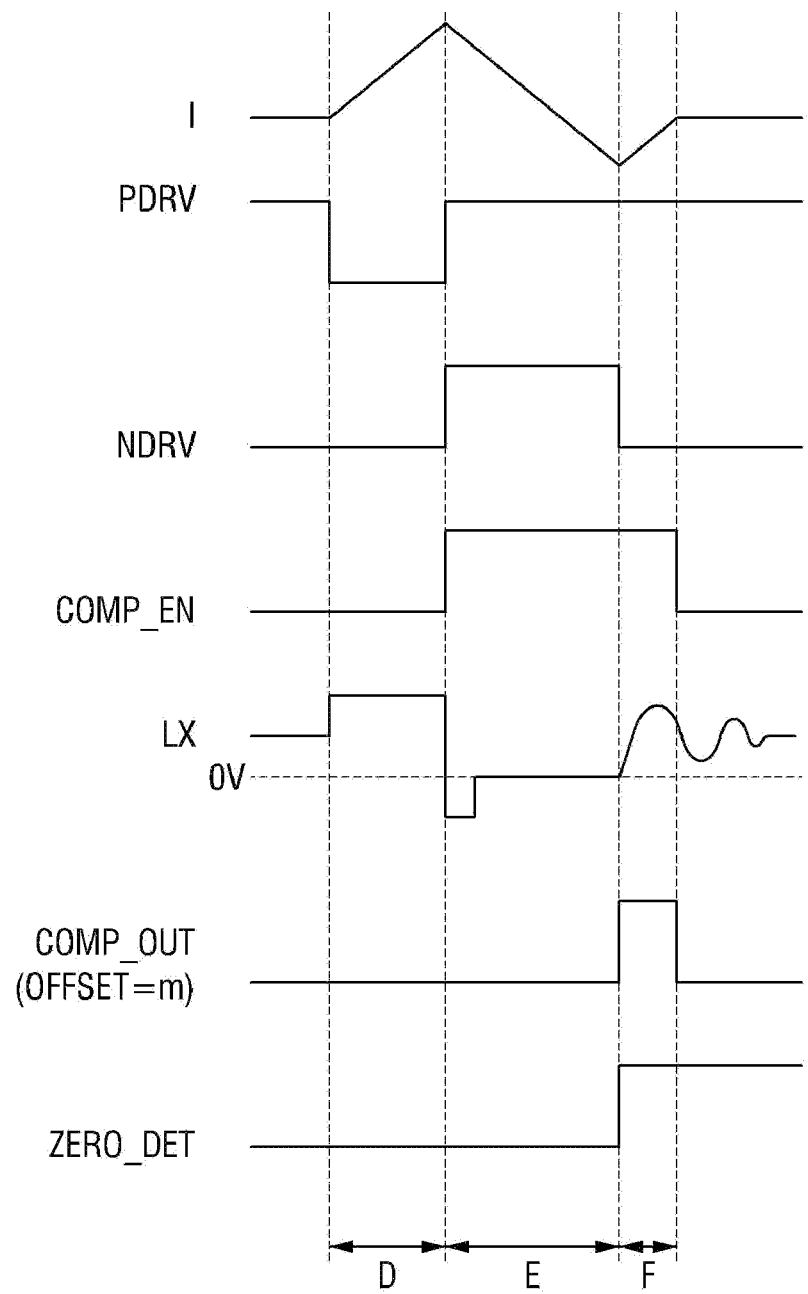
FIG. 4 is a timing diagram illustrating the operation of the switching regulator according to another embodiment.

FIG. 3 is a timing diagram illustrating the operation of the switching regulator according to an embodiment. FIG. 4 is a timing diagram illustrating the operation of the switching regulator according to another embodiment.

The control operation of the switch controller 30 in a case where the second switch 44 is turned off too early before the inductor current I becomes zero will now be described with reference to FIG. 3. For ease of description, it is assumed that the offset of the comparator 32 in a current period is set to m, where $1 \leq m \leq n$, and m and n are natural numbers.

Referring to FIGS. 1 and 3, in an A section, a level of the first switch control signal PDRV changes to the first level (e.g., the logical low level). Then, the first switch 42 is turned on by the first switch control signal PDRV to pull up the switching node LX from the input voltage Vin applied to the input terminal. Accordingly, the inductor current I increases.

In a B section, if the level of the first switch control signal PDRV changes to the second level (e.g., the logical high level), the first switch 42 is turned off by the first switch control signal PDRV. In addition, if the level of the second switch control signal NDRV changes to the second level (e.g., the logical high level), the second switch 44 is turned on by the second switch control signal NDRV to pull down the voltage of the switching node LX. Accordingly, the inductor current I flowing through the inductor 50 decreases. Since the parasitic diode 46 exists in the second switch 44, the voltage of the switching node LX drops to below 0 V and then bounces back up.

When the second switch 44 is turned on by the second switch control signal NDRV, the control logic 34 transmits the enable signal COMP_EN to the comparator 32. Accordingly, the comparator 32 begins to compare the voltage of the switching node LX input to the first input terminal + as the first voltage with the second voltage input to the second input terminal −.

In a C section, when the voltage of the switching node LX input to the first input terminal + of the comparator 32 as the first voltage becomes greater than the second voltage input to the second input terminal − of the comparator 32, the comparator 32 outputs the comparison signal COMP_OUT at the second level (e.g., the logical high level). The D flip-flop 36 which receives the comparison signal COMP_OUT at the second level generates the zero current detection signal ZERO_DET at the second level (e.g., the logical high level) and provides the zero current detection signal ZERO_DET at the second level to the gate driver 20. The gate driver 20 which receives the zero current detection signal ZERO_DET turns off the second switch 44 by changing the level of the second switch control signal NDRV to the first level (e.g., the logical low level).

In the C section of FIG. 3, since the inductor current I is not yet zero, the voltage of the switching node LX is dropped again to below 0 V by the turn-on voltage of the parasitic diode 46 existing in the second switch 44. In this case, the first voltage input to the first input terminal + of the comparator 32 becomes lower than the second voltage input to the second input terminal − of the comparator 32. Therefore, the level of the comparison signal COMP_OUT changes to the first level (e.g., the logical low level).

When detecting the change in the level of the comparison signal COMP_OUT to the first level (e.g., logical low level), the offset control logic 34-2 of the control logic 34 determines that the second switch 44 was turned off early due to a too high offset of the comparator 32. Therefore, the offset control logic 34-2 instructs the up-down counter 34-3 to reduce the number of bits of the digital offset control signal OFFSET(1:n) (i.e., reduce the offset of the comparator 32 to (m−1)). Accordingly, the turn-off time of the second switch 44 is later in a next period than in the current period.

The control logic 34 may continuously reduce the number of bits of the digital offset control signal OFFSET(1:n) by performing the above process a number of times. Then, when detecting that the level of the comparison signal COMP_OUT stays at the second level (e.g., the logical high level) without changing to the first level (e.g., the logical low level) even if the second switch 44 was turned off, the control logic 34 determines that the second switch 44 was turned off at a time when the inductor current I was nearly zero. Therefore, the control logic 34 maintains the offset of the comparator 32 without controlling the offset of the comparator 32 any more.

The control operation of the switch controller 30, in a case where the second switch 44 is turned off too late after the inductor current I becomes zero, will now be described with reference to FIGS. 1 and 4. For ease of description, it is assumed that the offset of the comparator 32 in a current period is set to m, where 1≤m≤n, and m and n are natural numbers.

Referring to FIGS. 1 and 4, in a D section, the level of the first switch control signal PDRV changes to the first level (e.g., the logical low level). Then, the first switch 42 is turned on by the first switch control signal PDRV to pull up the switching node LX from the input voltage Vin applied to the input terminal. Accordingly, the inductor current I increases.

In an E section, if the level of the first switch control signal PDRV changes to the second level (e.g., the logical high level), the first switch 42 is turned off by the first switch control signal PDRV. In addition, if the level of the second switch control signal NDRV changes to the second level (e.g., the logical high level), the second switch 44 is turned on by the second switch control signal NDRV to pull down the voltage of the switching node LX. Accordingly, the inductor current I flowing through the inductor 50 decreases. Since the parasitic diode 46 exists in the second switch 44, the voltage of the switching node LX drops to below 0 V and then bounces back up.

When the second switch 44 is turned on by the second switch control signal NDRV, the control logic 34 transmits the enable signal COMP_EN to the comparator 32. Accordingly, the comparator 32 begins to compare the voltage of the switching node LX input to the first input terminal + as the first voltage with the second voltage input to the second input terminal −.

In an F section, when the voltage of the switching node LX input to the first input terminal + of the comparator 32 as the first voltage becomes greater than the second voltage input to the second input terminal − of the comparator 32, the comparator 32 outputs the comparison signal COMP_OUT at the second level (e.g., the logical high level). The D flip-flop 36 which receives the comparison signal COMP_OUT at the second level generates the zero current detection signal ZERO_DET at the second level (e.g., the logical high level) and provides the zero current detection signal ZERO_DET at the second level to the gate driver 20. The gate driver 20 which receives the zero current detection signal ZERO_DET turns off the second switch 44 by changing the level of the second switch control signal NDRV to the first level (e.g., the logical low level).

In the F section of FIG. 4, since a long time has already passed since the inductor current I became zero (the value of the inductor current I is lower than an initial value, which indicates that a direction of the induction current I was changed), the switching node LX suffers from a ringing phenomenon. Therefore, the voltage of the switching node LX increases. In this case, the first voltage input to the first input terminal + of the comparator 32 stays greater than the second voltage input to the second input terminal − of the comparator 32. Therefore, the level of the comparison signal COMP_OUT stays at the second level (e.g., the logical high level) without changing to the first level (e.g., the logical low level).

When detecting that the level of the comparison signal COMP_OUT stays at the second level (e.g., logical high level), the offset control logic 34-2 of the control logic 34 determines that the second switch 44 was turned off late due to a too low offset of the comparator 32. Therefore, the offset control logic 34-2 instructs the up-down counter 34-3 to increase the number of bits of the digital offset control signal OFFSET(1:n) (that is, increase the offset of the comparator 32 to (m+1)). Accordingly, the turn-off time of the second switch 44 is earlier in a next period than in the current period.

The control logic 34 may continuously increase the number of bits of the digital offset control signal OFFSET(1:n) by performing the above process a number of times. Then, when detecting a change in the level of the comparison signal COMP_OUT to the first level (e.g., the logical low level), the control logic 34 determines that the second switch 44 was turned off at a time when the inductor current I was nearly zero. Therefore, the control logic 34 maintains the offset of the comparator 32 without controlling the offset of the comparator 32 any more.

In summary, the control logic 34 according to the current embodiment detects the output of the comparison signal COMP_OUT which reflects a change in the voltage of the switching node LX after the second switch 44 is turned off and reduces the offset of the comparator 32 if determining that the second switch 44 was turned off too early and increases the offset of the comparator 32 if determining that the second switch 44 was turned off too late. In this way, the control logic 34 according to the current embodiment can control the second switch 44 to be turned off at a time when the inductor current I is nearly zero in each successive pulse period.

In a state where the second switch 44 is controlled to be turned off at a time when the inductor current I is nearly zero, the switch controller 30 maintains this state as will be described below with reference to FIGS. 1 and 5.

Figure 5:
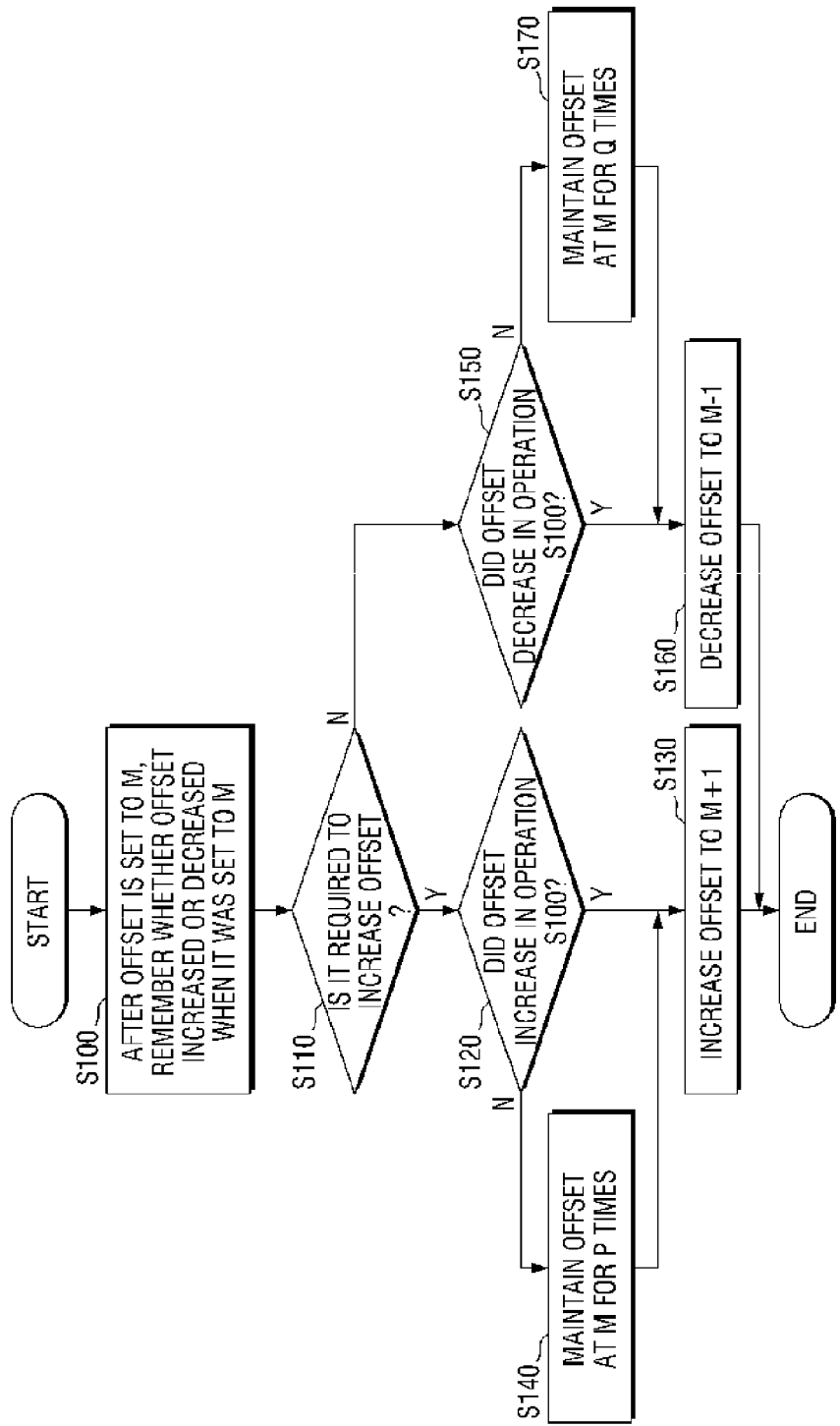
FIG. 5 is a flowchart illustrating the operation of the switching regulator according to another embodiment.

FIG. 5 is a flowchart illustrating the operation of the switching regulator according to another embodiment.

Referring to FIGS. 1 and 5, after the offset of the comparator 32, which has a value from 1 to n (n is a natural number), is set to m (1≤m≤n, where m is a natural number), the offset control logic 34-2 remembers whether the offset of the comparator 32 increased or decreased when it was set to m (operation S100). In other words, when the offset of the comparator 32 in a $(k-2)^{th}$ period was (m−1), if the offset of the comparator 32 was increased and set to m in a $(k-1)^{th}$ period, the offset control logic 34-2 may remember that the offset of the comparator 32 increased in the $(k-1)^{th}$ period. When the offset of the comparator 32 in the $(k-2)^{th}$ period was (m+1), if the offset of the comparator 32 in the $(k-1)^{th}$ period was decreased and set to m, the offset control logic 34-2 may remember that the offset decreased in the $(k-1)^{th}$ period.

Next, the offset control logic 34-2 determines whether it is required to increase or decrease the offset of the comparator 32 in a current period (e.g., a $k^{th}$ period) (operation S110). If it is required to increase the offset in the current period (e.g., the $k^{th}$ period) and if it was also required to increase the offset in a previous period (e.g., the $(k-1)^{th}$ period) (operation S120), there is a low probability that the turn-off time of the second switch 44 will be before the inductor current I becomes zero even if the offset of the comparator 32 is increased in the current period (e.g., the $k^{th}$ period). Therefore, the offset control logic 34-2 increases the offset of the comparator 32 to (m+1) in the current period (e.g., the $k^{th}$ period) (operation S130).

On the other hand, if it is required to increase the offset in the current period (e.g., the $k^{th}$ period) but if it was required to reduce the offset in the previous period (e.g., the $(k-1)^{th}$ period) (operation S120), there is a high probability that the turn-off time of the second switch 44 will be before the inductor current I becomes zero if the offset of the comparator 32 is increased in the current period (e.g., the $k^{th}$ period). This is because the offset of the comparator 32 must have been reduced in the previous period (e.g., the $(k-1)^{th}$ period) since the turn-off time of the second switch 44 in the previous period (e.g., the $(k-1)^{th}$ period) was before the inductor current I became zero.

In this case, the offset control logic 34-2 determines the current offset of the comparator 32 as an offset that can turn off the second switch 44 at a time when the inductor current I is nearly zero. Therefore, the offset control logic 34-2 maintains the offset of the comparator 32 at m (operation S140). After the same signal is repeated P times, the offset control logic 34-2 increases the offset of the comparator 32 to (m+1) in a next pulse (operation S130). If the offset of the comparator 32 is controlled as described above, the second switch 44 can be turned off at a time when the inductor current I is nearly zero without the need to change the offset of the comparator 32 for the next P times.

If it is required to reduce the offset in the current period (e.g., the $k^{th}$ period) and if it was also required to reduce the offset in the previous period (e.g., the $(k-1)^{th}$ period) (operation S150), there is a low probability that the turn-off time of the second switch 44 will be after the inductor current I becomes zero even if the offset of the comparator 32 is decreased in the current period (e.g., the $k^{th}$ period). Therefore, the offset control logic 34-2 reduces the offset of the comparator 32 to (m−1) in the current period (e.g., the $k^{th}$ period) (operation S160).

If it is required to reduce the offset in the current period (e.g., the $k^{th}$ period) but if it was required to increase the offset in the previous period (e.g., the $(k-1)^{th}$ period) (operation S150), there is a high probability that the turn-off time of the second switch 44 will be after the inductor current I becomes zero if the offset of the comparator 32 is decreased in the current period (e.g., the $k^{th}$ period). This is because the offset of the comparator 32 must have been increased in the previous period (e.g., the $(k-1)^{th}$ period) since the turn-off time of the second switch 44 in the previous period (e.g., the $(k-1)^{th}$ period) was after the inductor current I became zero.

In this case, the offset control logic 34-2 determines the current offset of the comparator 32 as an offset that can turn off the second switch 44 at a time when the inductor current I is nearly zero. Therefore, the offset control logic 34-2 maintains the offset of the comparator 32 at m (operation S170). After the same signal is repeated Q times, the offset control logic 34-2 reduces the offset of the comparator 32 to (m−1) in a next pulse (operation S160). If the offset of the comparator 32 is controlled as described above, the second switch 44 can be turned off at a time when the inductor current I is nearly zero without the need to change the offset of the comparator 32 for the next Q times.

In some embodiments, P and Q may be set to different natural numbers. If P and Q are set to different values, the turn-off time of the second switch 44 can be controlled more efficiently according to the operating conditions of the switching regulator. However, the exemplary embodiments are not limited thereto. In some other embodiments, P and Q may be set to the same natural number.

In a state where the second switch 44 is controlled to be turned off at a time when the inductor current I is nearly zero, another way in which the switch controller 30 maintains this state will be described below with reference to FIGS. 1 and 6.

Figure 6:
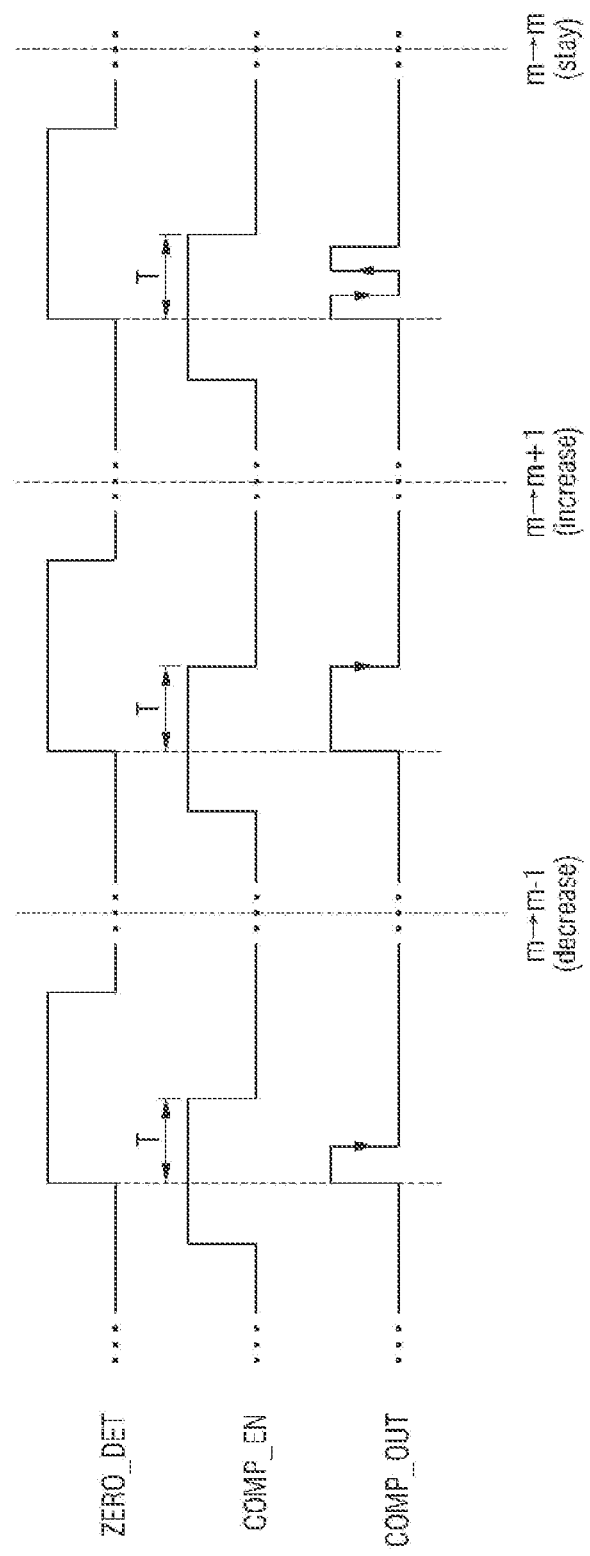
FIG. 6 is a timing diagram illustrating the operation of the switching regulator according to another embodiment.

FIG. 6 is a timing diagram illustrating the operation of the switching regulator according to another embodiment.

Referring to FIGS. 1 and 6, in the current embodiment, if a predetermined period of time T passes after the zero current detection signal ZERO_DET at the second level (e.g., the logical high level) is generated, the control logic 34 may block the enable signal COMP_EN provided to the comparator 32.

In a section in which the comparator 32 is enabled (a section in which the enable signal COMP_EN is provided to the comparator 32), the control logic 34 may control the offset of the comparator 32 by detecting the comparison signal COMP_OUT output from the comparator 32.

In particular, in the section in which the comparator 32 is enabled, if the comparison signal COMP_OUT stays at the first level (e.g., the logical low level) after changing to the second level (e.g., the logical high level), it means that the voltage of the switching node LX was dropped by the turn-on voltage of the parasitic diode 46 existing in the second switch 44. Therefore, the offset control logic 34-2 determines that the second switch 44 was turned off early before the inductor current I became zero. Accordingly, the offset control logic 34-2 decreases the offset of the comparator 32.

In addition, in the section in which the comparator 32 is enabled, if the comparison signal COMP_OUT stays at the second level (e.g., the logical high level) after changing to the second level (e.g., the logical high level), it means that the voltage of the switching node LX increased immediately while ringing. Therefore, the offset control logic 34-2 determines that the second switch 44 was turned off late in a state where the direction of the inductor current I was changed after a long time had passed since the inductor current I became zero. Accordingly, the offset control logic 34-2 increases the offset of the comparator 32.

In the section in which the comparator 32 is enabled, if the comparison signal COMP_OUT changes to the second level (e.g., the logical high level) twice, it means that the voltage of the switching node LX was dropped by the turn-on voltage of the parasitic diode 46 existing in the second switch 44 but bounced back up immediately since the inductor current I became zero. Therefore, the offset control logic 34-2 determines that the second switch 44 was turned off at a time when the inductor current I was nearly zero. Accordingly, the offset control logic 34-2 maintains the offset of the comparator 32.

In other words, in the current embodiment, the offset control logic 34-2 may decrease, increase, or maintain the offset of the comparator 32 by detecting a change in the comparison signal COMP_OUT of the comparator 32 enabled for a predetermined period of time T after the generation of the zero current detection signal ZERO_DET.

Semiconductor systems using a switching regulator according to embodiments will now be described with reference to FIGS. 7 through 9.

Figure 7:
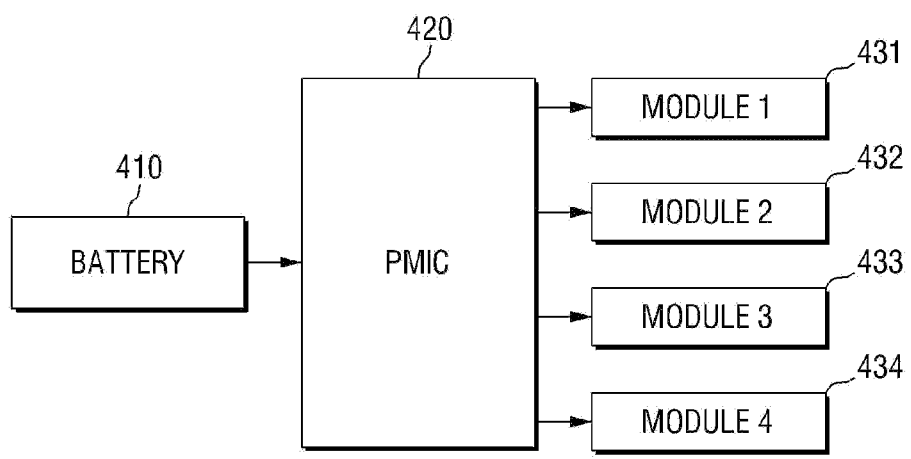
FIGS. 7 and 8 are conceptual block diagrams of semiconductor systems including a switching regulator according to embodiments.
Figure 8:
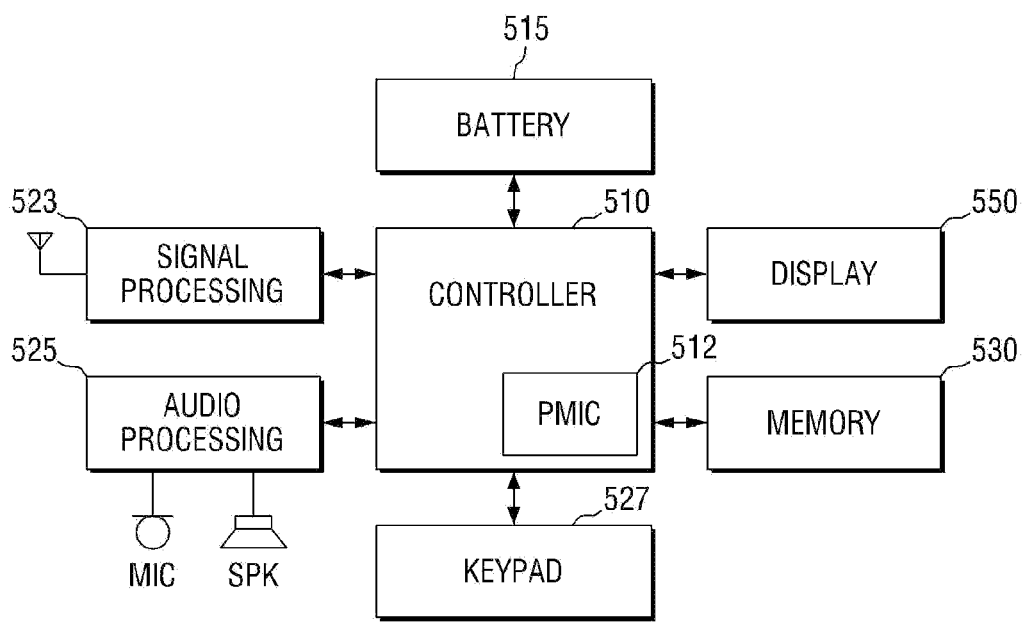
Figure 9:
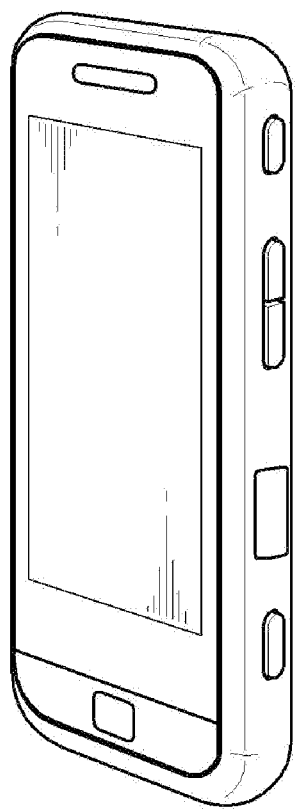
FIG. 9 is a diagram showing an example of the semiconductor system of FIG. 8.

FIGS. 7 and 8 are conceptual block diagrams of semiconductor systems including a switching regulator according to embodiments of the present invention. FIG. 9 is a diagram showing an example of the semiconductor system of FIG. 8.

Referring to FIG. 7, the semiconductor system according to some embodiments may include a battery 410, a power management IC (PMIC) 420, and a plurality of modules 431 through 434. The PMIC 420 receives a voltage from the battery 410, shifts the received voltage to a desired voltage level for each of the modules 431 through 434, and provides the voltage at the desired voltage level to each of the modules 431 through 434. The PMIC 420 may include the switching regulator according to the above-described embodiments.

Referring to FIG. 8, the semiconductor system according to some embodiments may include a controller 510, a PMIC 512, a battery 515, a signal processing unit 523, an audio processing unit 525, a memory 530, and a display unit 550.

A keypad 527 may include keys for inputting numbers and text information and function keys for setting various functions.

The signal processing unit 523 performs a wireless communication function of a portable terminal, and includes a radio frequency (RF) unit and a modem. The RF unit includes an RF transmitter which raises and amplifies the frequency of a signal to be transmitted and an RF receiver which low-noise amplifies a received signal and lowers the frequency of the received signal. The modem includes a transmitter which encodes and modulates a signal to be transmitted and a receiver which demodulates and decodes a received signal.

The audio processing unit 525 may form codec. The codec may include data codec and audio codec. The data codec processes packet data, and the audio codec processes audio signals such as sound and multimedia files. The audio processing unit 525 converts a digital audio signal received through the modem into an analog signal using the audio codec and reproduces the analog signal or converts an analog audio signal generated by a microphone into a digital audio signal using the audio code and transmits the digital audio signal to the modem. The code may be provided as a separate component or may be included in the controller 510 of the semiconductor system.

The memory 530 includes a read-only memory (ROM) and a random access memory (RAM). The memory 530 may include a program memory and a data memory. The memory 530 may store programs for controlling the operation of the portable terminal and data necessary for booting the portable terminal.

The display unit 550 displays an image signal and user data on the screen or displays data related to calls. The display unit 550 may be a liquid crystal display (LCD) or an organic light-emitting diode (OLED). If the LCD or the OLED is implemented in a touch screen method, the display unit 550 may operate as an input unit for controlling the portable terminal, together with the keypad 527.

The controller 510 controls the overall operation of the semiconductor system. As shown in the drawing, the controller 510 may include the PMIC 512. The PMIC 512 may receive a voltage from the battery 515 and shift the received voltage to a desired voltage level. The PMIC 512 may include the switching regulator according to the above-described embodiments.

The semiconductor systems according to the above embodiments of the present invention can be implemented in various forms of electronic devices. FIG. 9 is a diagram showing an example in which the semiconductor system of FIG. 8 is implemented as a smartphone 600.

The semiconductor systems according to the above embodiments can also be implemented as one of various components of an electronic device such as a computer, an ultra-mobile PC (UMPC), a workstation, a net-book, a personal digital assistant (PDA), a portable computer, a web tablet, a wireless phone, a mobile phone, a smart phone, an e-book, a portable multimedia player (PMP), a portable game device, a navigation device, a black box, a digital camera, a three-dimensional television, a digital audio recorder, a digital audio player, a digital picture recorder, a digital picture player, a digital video recorder, a digital video player, a device capable of transmitting/receiving information in wireless environments, one of various electronic devices constituting a home network, one of various electronic devices constituting a computer network, one of various electronic devices constituting a telematics network, a radio frequency identification (RFID) device, or one of various components constituting a computing system.

While some semiconductor systems to which a switching regulator according to embodiments can be applied have been described above, it is obvious to those of ordinary skill in the art that the switching regulator according to the embodiments is also applicable to other semiconductor systems not exemplified herein.

In concluding the detailed description, those skilled in the art will appreciate that many variations and modifications can be made to the preferred embodiments without substantially departing from the principles of the exemplary embodiments. Therefore, the disclosed preferred embodiments are used in a generic and descriptive sense only and not for purposes of limitation.

What is claimed is:

1. A switching regulator comprising:
    a switch configured to connect to a switching node and control an inductor current flowing through the switching node; and
    a switch controller configured to control a turn-off time of the switch by detecting a change in a voltage of the switching node after the switch is turned off,
    wherein the switch controller comprises:
        a comparator configured to compare a first voltage applied to a first input terminal connected to the switching node with a second voltage applied to a second input terminal connected to a first terminal of the switch and generate a comparison signal based on the comparison; and
        a control logic configured to receive the comparison signal of the comparator and control an offset of the comparator to adjust the turn-off time of the switch based on the comparison signal, and
    wherein the control logic is configured to reduce the offset of the comparator if the comparison signal indicates that the turn-off time is before the inductor current becomes zero and increase the offset of the comparator if the comparison signal indicates that the turn-off time is after the inductor current becomes zero.

2. The switching regulator of claim 1, wherein the control logic controls the offset of the comparator using a digital offset control signal.

3. The switching regulator of claim 2, wherein the control logic comprises:

an up-down counter configured to increase or decrease a number of bits of the digital offset control signal;

an offset control logic configured to control the up-down counter based on the comparison signal; and a timing control logic configured to control a time when an enable signal is transmitted to the comparator.

4. The switching regulator of claim 1, wherein the switch controller is a zero current detector.

5. The switching regulator of claim 4, wherein the switch controller further comprises:

a D flip-flop configured to output a predetermined zero current detection signal in response to receiving the comparison signal.

6. The switching regulator of claim 1, further comprising a parasitic diode provided between the first terminal and a second terminal of the switch, wherein a level of the comparison signal changes, after the switch is turned off, when a voltage of the switching node is dropped by the parasitic diode.

7. The switching regulator of claim 6, wherein if the level of the comparison signal changes, the control logic delays the turn-off time of the switch by reducing the offset of the comparator.

8. The switching regulator of claim 6, wherein if the level of the comparison signal does not change because the voltage of the switching node does not drop after the switch is turned off, the control logic advances the turn-off time of the switch by increasing the offset of the comparator.

9. The switching regulator of claim 1, wherein after the offset of the comparator is set to m, if it is required to increase the offset to (m+1):

if the offset of the comparator was set to m by being increased from (m−1), the control logic sets the offset of the comparator to (m+1); and if the offset of the comparator was set to m by being decreased from (m+1), the control logic maintains the offset of the comparator at m for P times and then sets the offset of the comparator to (m+1), and wherein after the offset of the comparator is set to m, if it is required to decrease the offset to (m−1):

if the offset of the comparator was set to m by being decreased from (m+1), the control logic sets the offset of the comparator to (m−1); and if the offset of the comparator was set to m by being increased from (m−1), the control logic maintains the offset of the comparator at m for Q times and then sets the offset of the comparator to (m−1), and wherein 1≤m≤n, m and n are natural numbers of digital bits, and P and Q are natural numbers.

10. The switching regulator of claim 1, wherein the control logic blocks an enable signal provided to the comparator if a predetermined period of time has passed since a zero current detection signal at a second level was generated, and controls the offset of the comparator by detecting the comparison signal output from the comparator when the comparator is enabled.

11. The switching regulator of claim 1, wherein the switch is an NMOS transistor.

12. The switching regulator of claim 1, wherein the switching regulator comprises a synchronous type switching regulator.

13. A comparator-based zero current detection method used by a switching regulator, the method comprising:

setting an offset of a comparator, which has a value from 1 to n, to m; and if it is required to increase the offset to (m+1):

setting the offset of the comparator to (m+1) if the offset of the comparator was set to m by being increased from (m−1), and maintaining the offset of the comparator at m for P times and then setting the offset of the comparator to (m+1) if the offset of the comparator was set to m by being decreased from (m+1), wherein 1≤m≤n, m and n are natural numbers of digital bits, and P is a natural number.

14. The method of claim 13, further comprising:

if it is required to decrease the offset to (m−1):

setting the offset of the comparator to (m−1) if the offset of the comparator was set to m by being decreased from (m+1), and maintaining the offset of the comparator at m for Q times and then setting the offset of the comparator to (m−1) if the offset of the comparator was set to m by being increased from (m−1), wherein Q is a natural number.

15. The method of claim 14, wherein P and Q are different natural numbers.

16. A switch controller, comprising:

a comparator comprising a first input terminal and a second input terminal, and configured to compare a first voltage applied to the first input terminal connected to an external switching node through which an inductor current flows with a second voltage applied to the second input terminal connected to a first terminal of an external switch; and a control logic configured to receive a comparison signal of the comparator based on the comparison of the first voltage and the second voltage, and control an offset of the comparator to adjust a turn-off time of the external switch, wherein the control logic is configured to reduce the offset of the comparator if the comparison signal indicates that the turn-off time is before the inductor current becomes zero and increase the offset of the comparator if the comparison signal indicates that the turn-off time is after the inductor current becomes zero.

17. The switch controller according to claim 16, wherein the switch controller further comprises:

a D flip-flop configured to output a predetermined zero current detection signal in response to the comparison signal of the comparator.

18. The switching controller according to claim 16, wherein the switch controller is a zero current detector.

19. The switching controller according to claim 16, wherein the offset of the comparator is controlled using a digital offset control signal.

20. The switching controller according to claim 19, wherein the control logic comprises:

an up-down counter configured to increase or decrease a number of bits of the digital offset control signal;

an offset control logic configured to control the up-down counter based on the comparison signal of the comparator; and a timing control logic configured to control a time when an enable signal is transmitted to the comparator.

* * * * *